(12) United States Patent
Nakayama et al.

(10) Patent No.: US 9,417,683 B2
(45) Date of Patent: Aug. 16, 2016

(54) DRIVING DEVICE FOR DRIVING A DISPLAY UNIT

(71) Applicant: LAPIS Semiconductor Co., Ltd., Yokohama (JP)

(72) Inventors: Akira Nakayama, Yokohama (JP); Hideaki Hasegawa, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 14/549,045

(22) Filed: Nov. 20, 2014

(65) Prior Publication Data

US 2015/0138254 A1  May 21, 2015

(30) Foreign Application Priority Data

Nov. 21, 2013 (JP) .................... 2013-241069

(51) Int. Cl.
*G09G 3/20* (2006.01)
*G09G 3/36* (2006.01)
*G06F 1/32* (2006.01)

(52) U.S. Cl.
CPC ............ *G06F 1/3265* (2013.01); *G09G 3/2092* (2013.01); *G09G 3/3688* (2013.01); *G09G 2310/0278* (2013.01); *G09G 2310/061* (2013.01); *G09G 2330/021* (2013.01)

(58) Field of Classification Search
CPC ... G09G 3/3696; G09G 5/008; G09G 3/2011; G09G 3/2927
See application file for complete search history.

(56) References Cited

U.S. PATENT DOCUMENTS

| 6,411,273 B1 * | 6/2002 | Nakamura | G09G 3/2011 345/205 |
| 2009/0267974 A1 * | 10/2009 | Kitagawa | G09G 3/2927 345/691 |
| 2014/0168233 A1 * | 6/2014 | Brijesh | G09G 3/2096 345/520 |

FOREIGN PATENT DOCUMENTS

JP  2001-312253 A  11/2001

* cited by examiner

*Primary Examiner* — Kevin M Nguyen
(74) *Attorney, Agent, or Firm* — Rabin & Berdo, P.C.

(57) ABSTRACT

Disclosed is a display unit driving device which has a reduced power consumption rate. The display unit displays an image in response to a video data signal which is constituted by a plurality of frames each including a data scanning period and a blanking period. The driving device stops power supply to a data driver for a predetermined power stop period within the blanking period. The data driver applies pixel drive voltages respectively corresponding to luminance levels of each pixel based on the video data signal to multiple data lines of the display device in each horizontal scanning cycle within the data scanning period.

10 Claims, 5 Drawing Sheets

DRIVING DEVICE FOR DRIVING A DISPLAY UNIT

BACKGROUND OF THE INVENTION

1. Field of the Invention

The present invention relates to a driving device for driving a display unit which displays an image corresponding to a video signal.

2. Description of the Related Art

A portable communication terminal, which may be either one of portable telephones, smartphones, tablet computers, notebook computers, navigation devices, and portable game machines, is nowadays popular and usually includes a display unit, such as a liquid crystal display panel or an organic electro-luminescence (EL) unit. The portable communication terminal employs either one of various kinds of power saving technologies in order to reserve continuous operation time of batteries. As one of those power saving technologies, there has been proposed a driving method which extends the display period for one frame at the time of driving a display unit to be two or more times the vertical scanning period of the input video signal to set a non-scanning period longer than the vertical scanning period, thereby reducing power consumption (refer to, e.g., Japanese Patent Application Laid-Open Publication No. 2001-312253).

However, with the above driving method, the consumption of static current occurs in the driver even during the non-scanning period, and hence power consumption cannot be reduced sufficiently.

SUMMARY OF THE INVENTION

An object of the present invention is to provide a driving device for driving a display unit that can reduce power consumption.

According to the present invention, there is provided a driving device for a driving display unit which displays an image based on a video data signal during each frame display period including a data scanning period and a blanking period. The driving device comprises a data driver that applies pixel drive voltages respectively corresponding to luminance levels of each pixel based on the video data signal to multiple data lines of the display unit in each horizontal scanning cycle during the data scanning period as long as power supply thereto is kept; and a drive controller that performs power supply to the data driver except for a predetermined power stop period in the blanking period.

DETAILED DESCRIPTION OF THE INVENTION

An embodiment of the present invention will be described in detail below with reference to the drawings.

Figure 1:
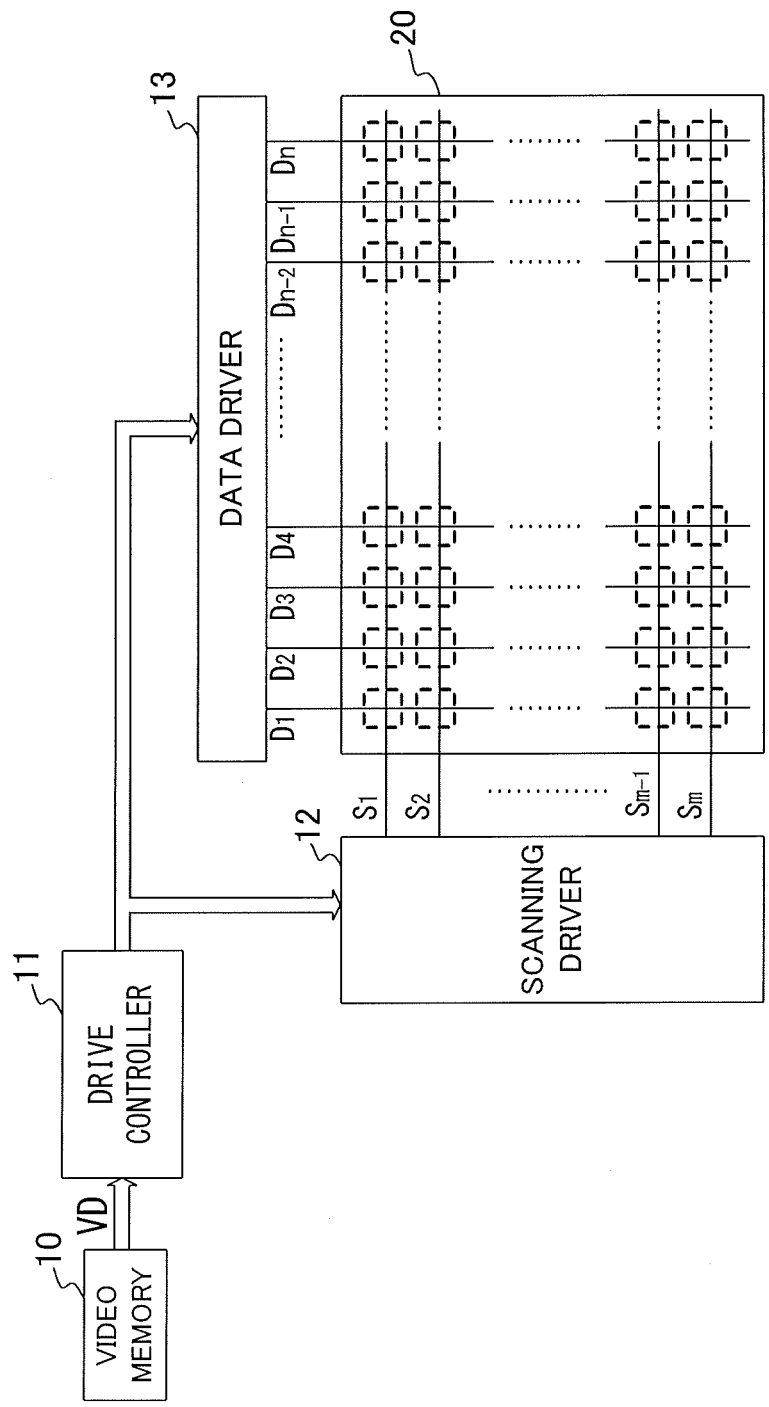
FIG. 1 is a block diagram illustrating a driving device for driving a display unit according to the present invention.

FIG. 1 is a diagram showing schematically the configuration of a display apparatus having incorporated therein a driving device for driving a display unit according to the present invention. As illustrated in FIG. 1, this display apparatus is formed of a video memory 10, a drive controller 11, a scanning driver 12, a data driver 13, and a display unit 20 constituted by liquid crystal or organic EL.

In the display unit 20, there are formed m number of horizontal scan lines $S_1$ to $S_m$ (m is a natural number of two or more), which extend in a horizontal direction of a two-dimensional screen and n number of data lines $D_1$ to $D_n$ (n is a natural number of two or more), which extend in a vertical direction of the two-dimensional screen. Display cells carrying pixels are respectively formed at intersection areas between the horizontal scan lines and the data lines, i.e., in the areas encircled by rectangular broken lines in FIG. 1.

The video memory 10 stores video data signals provided by a variety of application software (hereinafter called AP) or video data signals obtained through reception by a television tuner or the like. The video memory 10 reads out a video data signal stored therein to supply as a video data signal VD to the drive controller 11.

Figure 2:
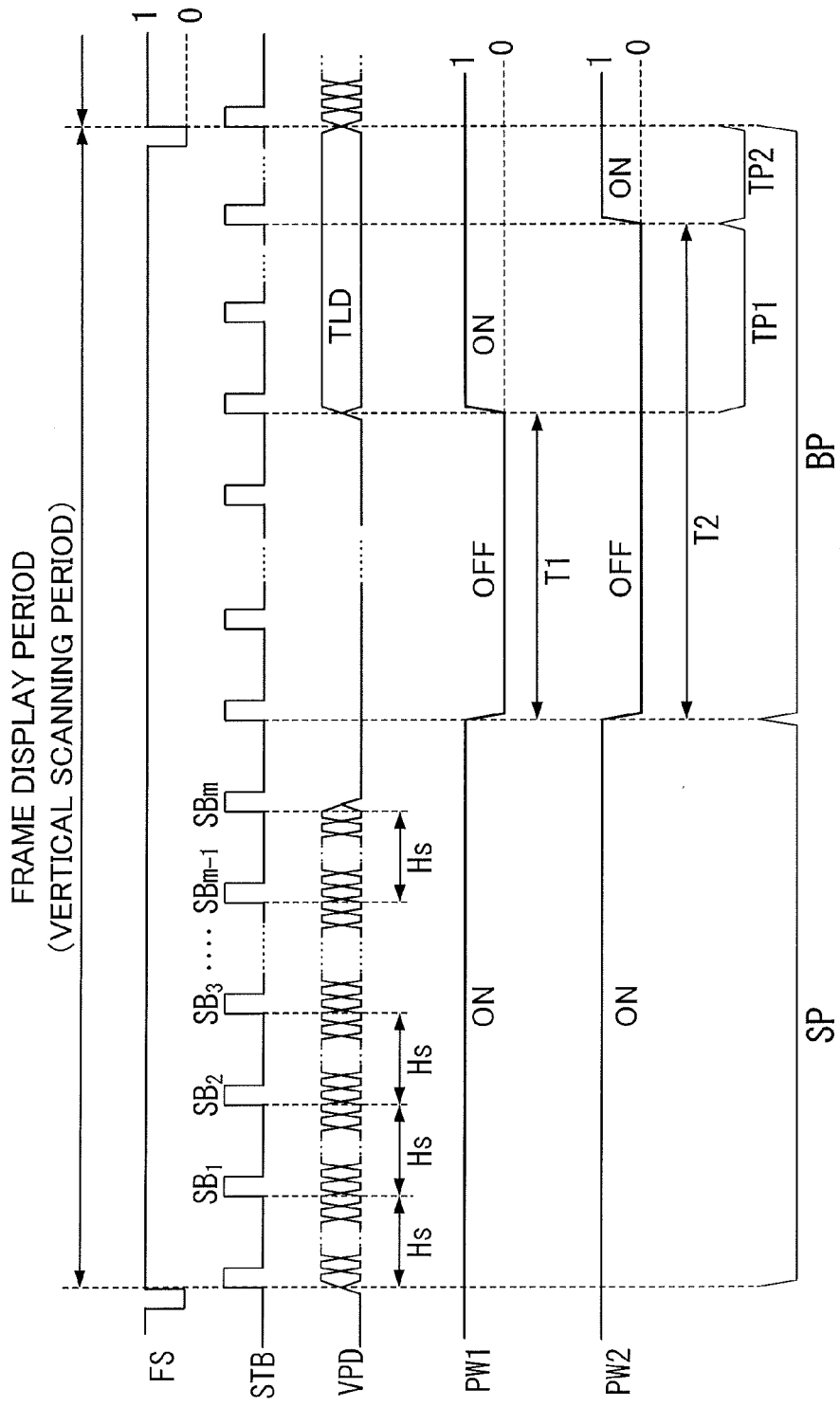
FIG. 2 is a time chart illustrating changes of signals generated by the driving device during a frame display period.

The drive controller 11 generates a sequence of pixel data PD on the basis of the video data signal VD read out from the video memory 10. The sequence of pixel data PD indicates the luminance levels of each pixel with a bit string of, for example, 8 bits. A reference timing signal that indicates reference timings of a clock signal is superimposed on the sequence of pixel data PD to obtain pixel data sequence signals VPD. The pixel data sequence signals VPD are supplied to the data driver 13. Also, the drive controller 11 generates a vertical sync signals FS that are synchronized with the frame of each image, as illustrated in FIG. 2. The vertical sync signals FS are supplied to the data driver 13.

The drive controller 11 generates a strobe signal STB formed of a sequence of strobe pulses SB indicating horizontal scanning timing for the display unit 20 in response to the video data signal VD as illustrated in FIG. 2. The strobe signal STB is supplied to the scanning driver 12 and the data driver 13. The cycle of strobe pulses SB in the strobe signal STB is equal to the horizontal scanning cycle Hs of horizontal scanning pulses (described later), which are applied to drive the display unit 20. Here, as illustrated in FIG. 2, the period from when a first strobe pulse $SB_1$ corresponding to scan line $S_1$ is supplied until an mth strobe pulse $SB_m$ corresponding to scan line $S_m$ is supplied in each frame display period (vertical scanning period) is defined as a data scanning period SP, and the subsequent period to this is defined as a blanking period BP. In the data scanning period SP, as illustrated in FIG. 2, the drive controller 11 generates power switch signals PW1 and PW2 having, e.g., a logic level of 1 to assert continued power supply. The signals PW1 and PW2 are supplied to the data driver 13. As illustrated in FIG. 2, when the period switches from the data scanning period SP to the blanking period BP, the drive controller 11 supplies to the data driver 13 a power switch signal PW1 of logic level 0 that is, for example, to stop power supply for a predetermined power stop period T1 starting at the moment of switchover. The drive controller 11 then returns the power switch signal PW1 to the state of the logic level 1. Further, when the period switches from the data scanning period SP to the blanking period BP, the drive controller 11 supplies the power switch signal PW2 of logic level 0 to the data driver 13 to stop power supply for a predetermined power stop period T2 (T2>T1) starting from the moment of switchover. The drive controller 11 then returns the power switch signal PW2 to the state of the logic level 1. As illustrated in FIG. 2, when the power stop period T1 has elapsed from the start time of the blanking period BP, the drive controller 11 starts generating the pixel data sequence signal VPD including a data sequence TLD for clock synchronization training which includes a dummy pixel data sequence and the above-described reference timing signal superimposed thereon. The generated pixel data sequence signals VPD are supplied to the data driver 13.

Figure 3:
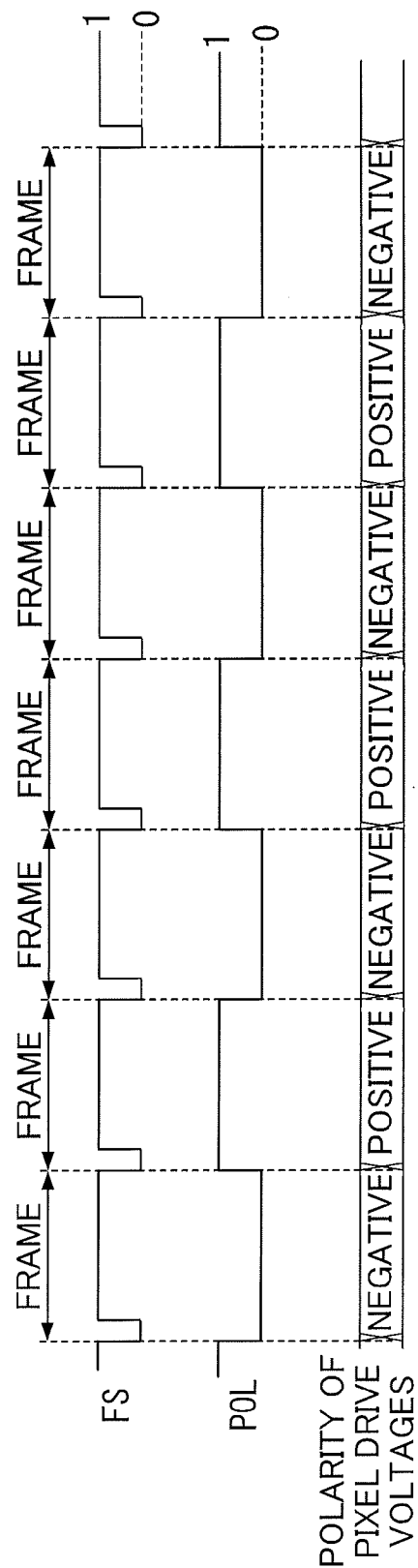
FIG. 3 is a time chart illustrating a change of polarity switching signal POL.

The drive controller 11 generates a polarity switching signal POL which switches the polarity of the pixel drive voltages applied to the display unit 20, from positive polarity to negative polarity or from negative polarity to positive polarity, for each frame as illustrated in FIG. 3 for example. The generated polarity switching signal POL is supplied to the data driver 13. For example, as illustrated in FIG. 3, at the timing of the rising edge and falling edge of the polarity switching signal POL, the polarity of the pixel drive voltages switches from negative polarity to positive polarity or from positive polarity to negative polarity.

The scanning driver 12 generates horizontal scanning pulses having a predetermined peak voltage and synchronized with each strobe pulse in the strobe signal STB supplied from the drive controller 11. The scanning driver 12 sequentially applies the horizontal scanning pulses to each of the scan lines $S_1$ to $S_m$ of the display unit 20 in an alternative way.

Figure 4:
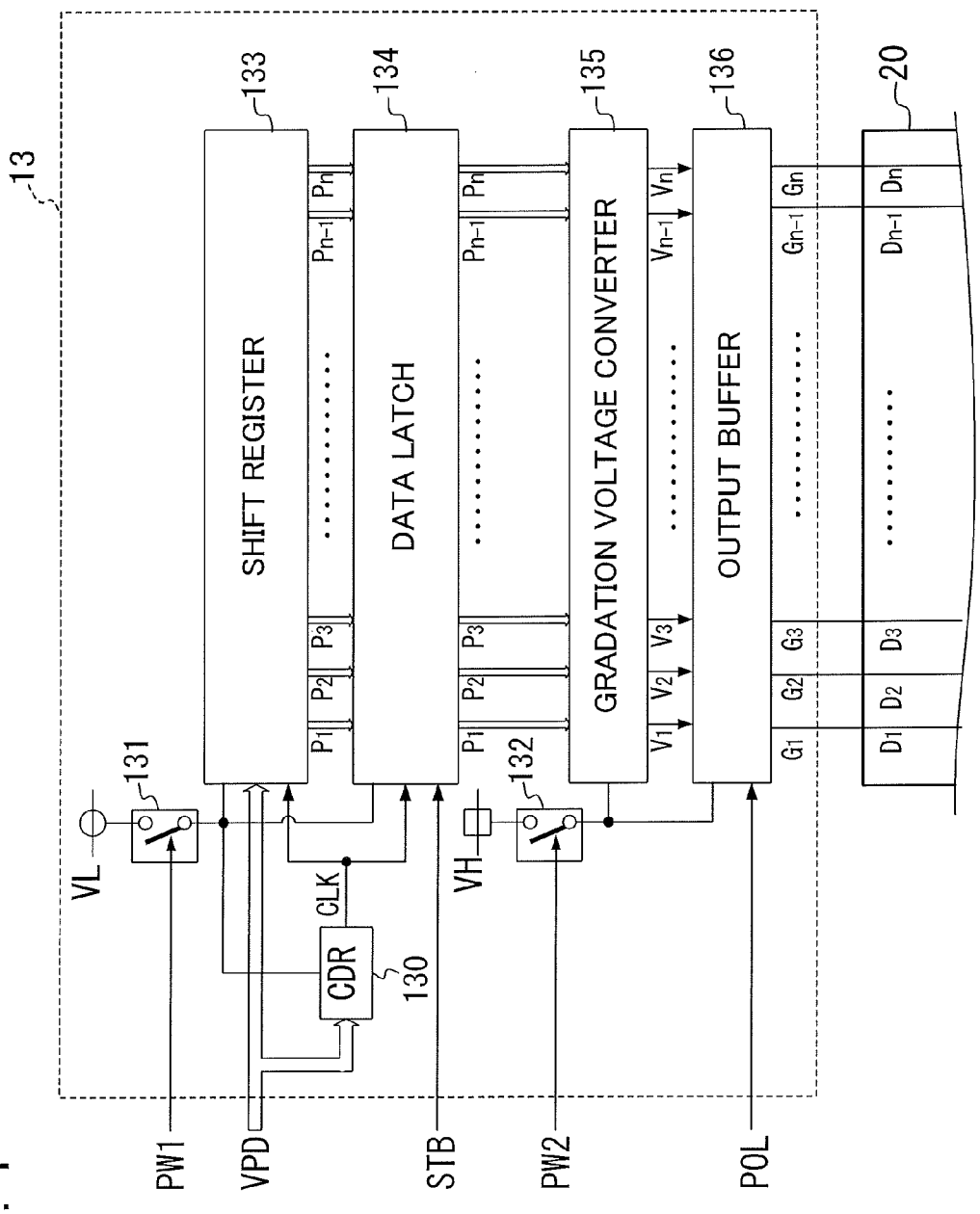
FIG. 4 is a block diagram illustrating an internal configuration of a data driver 13.

FIG. 4 is a block diagram illustrating the internal configuration of the data driver 13. As illustrated in FIG. 4, the data driver 13 includes a clock data recovery (hereinafter referred to as CDR) circuit 130, power switches 131 and 132, a shift register 133, a data latch 134, a gradation voltage converter 135, and an output buffer 136.

The CDR circuit 130 extracts the reference timing signal from the pixel data sequence signal VPD supplied from the drive controller 11. The CDR circuit 130 then generates a clock signal CLK synchronized in phase with the reference timing signal, and supplies it to the shift register 133 and the data latch 134.

The power switch 131 is in an ON state while the power switch signal PW1 of logic level of 1 that is, for example, to assert continued power supply is being supplied from the drive controller 11. Consequently, a source voltage VL for driving digital circuits is supplied to the CDR circuit 130, and the shift register 133 and the data latch 134 which serve as a data taking unit. Thus, during this time, the CDR circuit 130, the shift register 133, and the data latch 134 are in an operable state in response to the supply of the source voltage VL. While the power switch signal PW1 of logic level 0 that is, for example, to stop power supply is being supplied, the power switch 131 is in an OFF state. Consequently, supply of the source voltage VL to the CDR circuit 130, the shift register 133, and the data latch 134 is stopped. Thus, during this time, the CDR circuit 130, the shift register 133, and the data latch 134 are in an operation suspended state.

The power switch 132 is in an ON state while the power switch signal PW2 of the logic level 1 that is, for example, to assert continued power supply is being supplied from the drive controller 11. Consequently, a source voltage VH for driving pixels is supplied to the gradation voltage converter 135 and the output buffer 136 which serve as a pixel drive voltage outputting unit. Thus, during this time, the gradation voltage converter 135 and the output buffer 136 are in an operable state in response to the supply of the source voltage VH. While the power switch signal PW2 of, for example, the logic level 0 that is to stop power supply is being supplied, the power switch 132 is in an OFF state. Consequently, supply of the source voltage VH to the gradation voltage converter 135 and the output buffer 136 is stopped. Thus, during this time, the gradation voltage converter 135 and the output buffer 136 are in an operation suspended state.

The shift register 133 sequentially takes in pixel data PD respectively corresponding to the pixels at timings synchronized with the clock signal CLK, from the pixel data sequence signals VPD supplied from the drive controller 11. Whenever data of one horizontal scan line (n data sets) is taken in, the shift register 133 supplies n sets of pixel data PD as pixel data $P_1$ to $P_n$ to the data latch 134.

The data latch 134 takes in the pixel data $P_1$ to $P_n$ supplied from the shift register 133 at a timing synchronized with the clock signal CLK in response to the strobe signal STB illustrated in FIG. 2, and supplies these data sets to the gradation voltage converter 135.

The gradation voltage converter 135 converts the pixel data $P_1$ to $P_n$ supplied from the data latch 134 into pixel drive voltages $V_1$ to $V_n$ having voltage values respectively corresponding to the luminance levels of each pixel, and supplies the pixel drive voltages $V_1$ to $V_n$ to the output buffer 136.

The output buffer 136 switches the polarity of the respective pixel drive voltages $V_1$ to $V_n$ from positive polarity to negative polarity or from negative polarity to positive polarity at an edge timing of the polarity switching signal POL supplied from the drive controller 11. The output buffer 136 switches the polarity of the pixel drive voltage in each pixel as described above and then amplifies each of the pixel drive voltages to a desired level. Thus-generated pixel drive voltages $G_1$ to $G_n$ are applied to data lines $D_1$ to $D_n$ of the display unit 20.

As illustrated in FIG. 2, during the data scanning period SP in each of the frame display periods in the display unit 20, scanning pulses synchronized with the strobe pulses $SB_1$ to $SB_m$ are sequentially applied to the scan lines $S_1$ to $S_m$ in an alternative way. As a result, a picture corresponding to the pixel drive voltages $G_1$ to $G_n$ is displayed one scan line at a time in order.

Operations of the aforementioned driving device including the drive controller 11 and the data driver 13 will be described below.

The drive controller 11 supplies the power switch signals (PW1, PW2) to the data driver 13 so that the power supply to the data driver 13 is selectively stopped for a power stop period (T1, T2) within the data blanking period BP in each frame display period as illustrated in FIG. 2. That is, the drive controller 11 stops the supply of the source voltage VL to the CDR circuit 130, the shift register 133, and the data latch 134 by the power switch signal PW1 of logic level 0 illustrated in FIG. 2. Supply of the source voltage VH to the gradation voltage converter 135 and the output buffer 136 is stopped by the power switch signal PW2 of logic level 0.

To sum up, in the driving device according to the present invention, when an image based on the video data signal (VD) is displayed on the display unit (20) in each frame display period including the data scanning period (SP) and the blanking period (BP), the drive controller (11) controls the data driver (13) as follows. That is, the power supply to the data driver is stopped for the power stop period within the blanking period. The data driver applies the pixel drive voltages respectively corresponding to the luminance levels of each pixel based on the video data signal to the data lines ($D_1$ to $D_n$) in each horizontal scanning cycle (Hs) within the data scanning period.

Thus, power supply to the data driver is stopped for the power stop period within the blanking period of each frame display period, and hence during this time, electric power consumption in the data driver including static power consumption is zero.

Thus, power consumption can be greatly reduced with this driving device as compared with conventional driving devices in which static power consumption occurs even if operation is stopped due to the supply of the control signals being stopped.

Further, the horizontal scanning cycle Hs for scanning the horizontal scan lines $S_1$ to $S_m$ of the display unit 20 is shortened in order to secure the power stop period (T1, T2) within the blanking period BP as illustrated in FIG. 2. This makes it possible to secure the power stop period (T1, T2) within the blanking period BP without extending the frame display period. If, for example, the frame display period is set at 1/30 sec and the horizontal scanning cycle Hs is shortened and the data scanning period SP is set at 1/60 sec, the remaining 1/60 sec can be used as the blanking period BP, and hence the power stop period can be set within this 1/60 sec.

To sum up, the drive controller elongates the power stop period within the blanking period BP as much as the horizontal scanning cycle is shortened, so that the driving device according to the present invention reduces power consumption without extending the frame display period. Thus, not only when displaying motionless images like a still image but also when displaying moving images, both suppression of power consumption and smooth motion of good moving images can be achieved.

The drive controller 11 supplies the data driver 13 with the pixel data sequence signal VPD represents the video data signal VD and the reference timing signal according to an embedded clock scheme. The CDR circuit 130 provided in the data driver 13 generates the clock signal CLK synchronized in phase with the reference timing signal in the pixel data sequence signal VPD, and supplies the clock signal CLK to the shift register 133 and the data latch 134. Thus, once power supply to the CDR circuit 130 is stopped during the power stop period, even if power supply thereto is subsequently restarted, the CDR circuit 130 cannot immediately generate a stable clock signal CLK synchronized in phase with the reference timing signal. That is, the clock signal CLK is unstable from when power supply to the CDR circuit 130 is restarted until a predetermined clock stabilizing period has elapsed. Hence, if the shift register 133 and the data latch 134 take in pixel data corresponding to the next frame in response to this unstable clock signal CLK, wrong data may be taken in, and displayed video may be temporarily disturbed.

Accordingly, as illustrated in FIG. 2, a training period TP1 including a clock stabilizing period is placed immediately before the transition to the next frame display period in each frame display period, and the drive controller 11 controls the CDR circuit 130 to restart operation in this training period TP1. That is, the drive controller 11 sets the remaining period of the frame display period after the removal of the data scanning period SP and the clock stabilizing period as the power stop period T1 illustrated in FIG. 2 at first. The drive controller then stops power supply to the CDR circuit 130, the shift register 133, and the data latch 134 by the power switch signal PW1 of the logic level 0 during this power stop period T1. After the power stop period T1 elapses, the drive controller 11 performs power supply to the CDR circuit 130, the shift register 133, and the data latch 134 by the power switch signal PW1 of the logic level 1. The drive controller supplies the pixel data sequence signal VPD including a data sequence TLD for clock synchronization training and the reference timing signal superimposed thereon to the CDR circuit 130. The CDR circuit 130 extracts the reference timing signal from this data sequence TLD and starts generating the clock signal CLK synchronized in phase with the reference timing signal. The clock signal CLK generated by the CDR circuit 130 becomes stable during the training period TP1 as a clock stabilizing period. Thus, the CDR circuit 130 can start supplying the stable clock signal CLK to the shift register 133 and the data latch 134 immediately before the next frame display period.

The drive controller 11 stops power supply to the gradation voltage converter 135 and the output buffer 136 in the data driver 13 by the power switch signal PW2 of the logic level 0 during not only the power stop period T1, but also the following period including the training period TP1. The voltage value of the source voltage VH for driving pixels supplied to the gradation voltage converter 135 and the output buffer 136 is a higher than the voltage value of the source voltage VL for driving digital circuits. Accordingly, there occurs a delay from when the power switch 132 illustrated in FIG. 4 changes from the OFF state to the ON state until the voltage on the source line formed in the gradation voltage converter 135 and the output buffer 136 actually reaches the source voltage VH. The delay is larger than the period from when the power switch 131 changes from the OFF state to the ON state until the voltage on the source line formed in the shift register 133 and the data latch 134 reach the source voltage VL. That is, the voltage on the source line formed in the gradation voltage converter 135 and the output buffer 136 does not reach the source voltage VH from when the power switch 132 changes from the OFF state to the ON state according to the power switch signal PW2 until a predetermined source voltage stabilizing period has elapsed. If operation in the next frame display period starts before the voltage on the source line formed in the gradation voltage converter 135 and the output buffer 136 reaches the source voltage VH, that is, when the voltage is lower than the source voltage VH, the output buffer 136 may generate wrong pixel drive voltages, and displayed video may be temporarily disturbed.

Accordingly, as illustrated in FIG. 2, a training period TP2 including the above source voltage stabilizing period is placed immediately before the transition to the next frame display period, and the drive controller 11 restarts power supply to the gradation voltage converter 135 and the output buffer 136 in this training period TP2. That is, first, the drive controller 11 sets the remaining period of the frame display period after the removal of the data scanning period SP and the source voltage stabilizing period as the power stop period T2 illustrated in FIG. 2. The drive controller 11 stops power supply to the gradation voltage converter 135 and the output buffer 136 by the power switch signal PW2 of the logic level 0 during this power stop period T2. After the power stop period T2 elapses, the drive controller 11 restarts power supply to the gradation voltage converter 135 and the output buffer 136 by the power switch signal PW2 of the logic level 1. Thus, the gradation voltage converter 135 and the output buffer 136 can start operating with the source voltage VH immediately before the next frame display period.

Further, the training period TP1 including the clock stabilizing period for the clock signal to stabilize after restart of power supply, and the training period TP2 including the source voltage stabilizing period for the voltage value to reach the desired source voltage VH after restart of power supply, are placed at the end of each frame display period, that is, immediately before the frame display period as illustrated in FIG. 2. Thus, even where the data driver configured to generate the clock signal internally according to the embedded clock scheme is adopted, the data driver can take in image data with the stable clock signal and the desired source voltage from the beginning of the next frame display period on.

Figure 5:
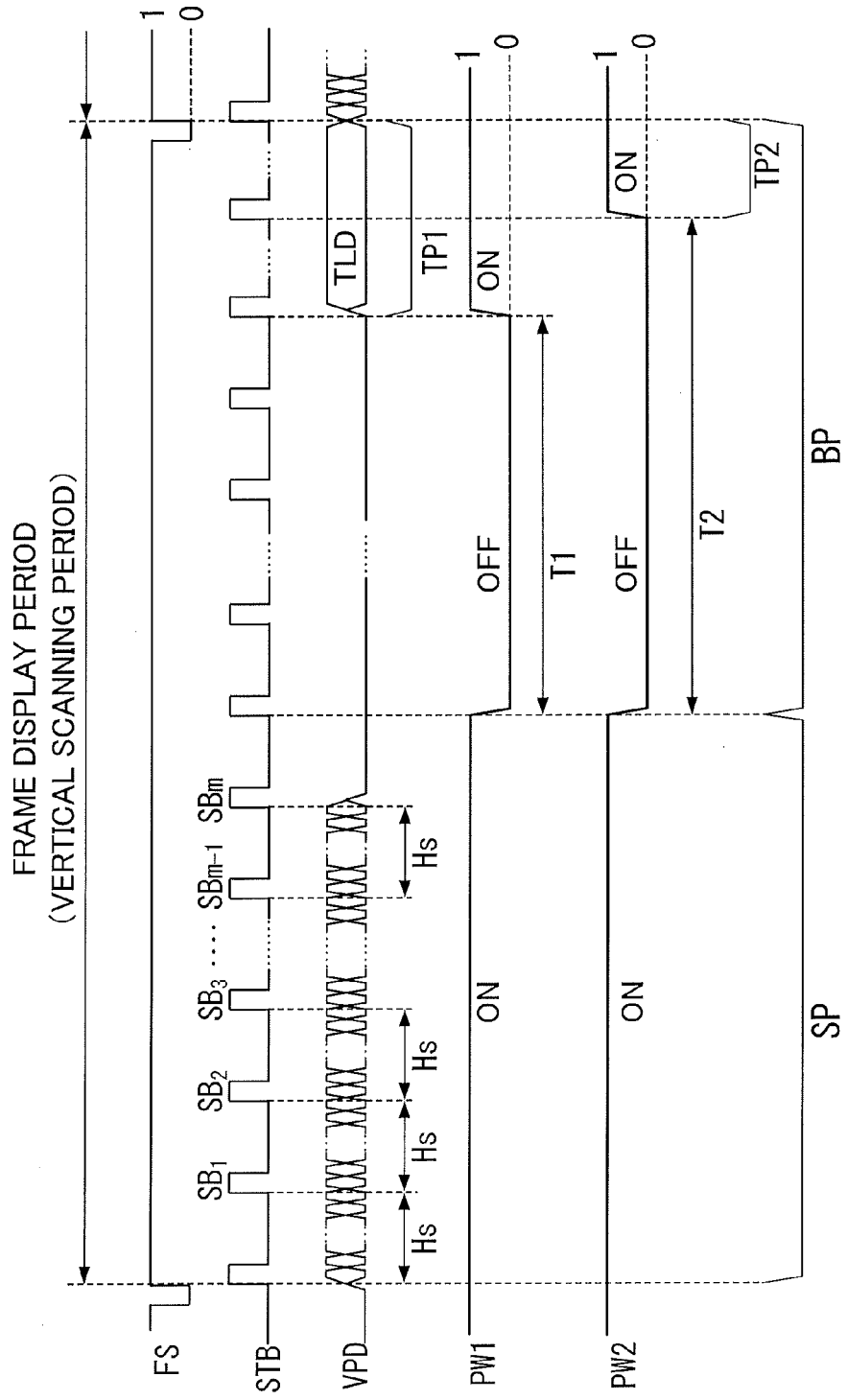
FIG. 5 is a time chart illustrating another example of changes of signals in the operation of the driving device during the frame display period.

Although in the embodiment illustrated in FIG. 2 the training period TP2 is placed after the training period TP1, as illustrated in FIG. 5, the training period TP1 and the training period TP2 may overlap. The end time of the training period TP1 and the end time of the training period TP2 may coincide as illustrated in FIG. 5. Thus, the start time of the training period TP1 is delayed, and the power stop period T1 can be elongated accordingly as illustrated in FIG. 5. Hence, power consumption can be reduced compared with the case of driving as illustrated in FIG. 2.

This application is based on a Japanese Patent application No. 2013-241069 which is hereby incorporated by reference.

What is claimed is:

1. A driving device for a display unit which displays an image based on a video data signal during each frame display period including a data scanning period and a blanking period, comprising:
   a data driver that applies pixel drive voltages respectively corresponding to luminance levels of each pixel based on said video data signal to multiple data lines of said display unit in each horizontal scanning cycle during said data scanning period as long as power supply thereto is kept; and
   a drive controller that performs power supply to said data driver and superimposes a reference timing signal on said video data signal and supplies the video data signal to said data driver,
   wherein said data driver comprises:
      a clock data recovery circuit that generates a clock signal synchronized in phase with said reference timing signal extracted from said video data signal;
      a data taking-in unit that sequentially takes in respective pixel data denoting luminance levels of each pixel based on said video data signal in response to said clock signal and, each time that one horizontal scan line worth of pixel data has been taken in, outputs the one horizontal scan line worth of pixel data; and
      a pixel-driving voltage outputting unit that generates said pixel drive voltages corresponding to the pixels based on their respective pixel data in said one horizontal scan line worth of pixel data outputted from said data taking-in unit to supply to said multiple data lines, and
   wherein said drive controller stops the power supply to said clock data recovery circuit and said data taking-in unit for a first power stop period within said blanking period, and stops the power supply to said pixel-driving voltage outputting unit for a second power stop period within said blanking period.

2. A driving device for driving a display unit according to claim 1, wherein said drive controller regulates in length said first and second power stop periods such that the shorter said horizontal scanning cycle is, the longer said first and second power stop periods are.

3. A driving device for driving a display unit according to claim 1,
   wherein said drive controller performs the power supply to said clock data recovery circuit during a first training period after said first power stop period within said blanking period, and supplies a data sequence signal represents a dummy pixel data sequence including said reference timing signal to said clock data recovery circuit.

4. A driving device for driving a display unit according to claim 2,
   wherein said drive controller performs the power supply to said clock data recovery circuit during a first training period after said first power stop period in said blanking period, and supplies a data sequence represents a dummy pixel data sequence including said reference timing signal to said clock data recovery circuit.

5. A driving device for driving a display unit according to claim 3,
   wherein said drive controller performs the power supply to said pixel-driving voltage outputting unit during a second training period after said second power stop period within said blanking period.

6. A driving device for driving a display unit according to claim 4,
   wherein said drive controller performs the power supply to said pixel-driving voltage outputting unit during a second training period after said second power stop period within said blanking period.

7. A driving device for driving a display unit according to claim 5, wherein said first training period and said second training period overlap.

8. A driving device for driving a display unit according to claim 6, wherein said first training period and said second training period overlap.

9. A driving device for driving a display unit according to claim 7, wherein the end time of said first training period and the end time of said second training period are made to coincide.

10. A driving device for driving a display unit according to claim 8, wherein the end time of said first training period and the end time of said second training period are made to coincide.

* * * * *